US010333834B2

(12) United States Patent
Fujita et al.

(10) Patent No.: US 10,333,834 B2
(45) Date of Patent: Jun. 25, 2019

(54) AUTOMATIC PACKET RECEPTION APPARATUS

(71) Applicant: NTT Electronics Corporation, Yokohama-shi, Kanagawa (JP)

(72) Inventors: Hiromi Fujita, Kanagawa (JP); Hidenori Nagayama, Kanagawa (JP)

(73) Assignee: NTT Electronics Corporation, Yokohama (JP)

( * ) Notice: Subject to any disclaimer, the term of this patent is extended or adjusted under 35 U.S.C. 154(b) by 0 days.

(21) Appl. No.: 15/118,062

(22) PCT Filed: Nov. 26, 2014

(86) PCT No.: PCT/JP2014/081207
§ 371 (c)(1),
(2) Date: Aug. 10, 2016

(87) PCT Pub. No.: WO2015/145869
PCT Pub. Date: Oct. 1, 2015

(65) Prior Publication Data
US 2017/0012864 A1 Jan. 12, 2017

(30) Foreign Application Priority Data

Mar. 25, 2014 (JP) .................. 2014-061729

(51) Int. Cl.
*H04L 12/751* (2013.01)
*H04L 12/721* (2013.01)
(Continued)

(52) U.S. Cl.
CPC .......... *H04L 45/34* (2013.01); *H04L 12/6418* (2013.01); *H04L 45/745* (2013.01); *H04L 69/22* (2013.01)

(58) Field of Classification Search
None
See application file for complete search history.

(56) References Cited

U.S. PATENT DOCUMENTS 6,430,183 B1 * 8/2002 Satran ............... H04L 29/06
370/349
2002/0064164 A1 * 5/2002 Barany ............... H04L 29/06
370/401

(Continued)

FOREIGN PATENT DOCUMENTS

JP 2000-201125 A 7/2000
JP 2013-042492 A 2/2013

OTHER PUBLICATIONS

International Preliminary Report on Patentability and Written Opinion of related International Patent Application No. PCT/JP2014/081207 dated Oct. 6, 2016.

(Continued)

*Primary Examiner* — Ayanah S George
(74) *Attorney, Agent, or Firm* — Arent Fox LLP

(57) ABSTRACT

A packet receiving unit (4) receives an IP packet having a network parameter and a transmission source identifier. A transmission source identifier table (5) records the transmission source identifier of the received IP packet. A packet storage processing unit (6) stores the received IP packet in a first buffer (7) regardless of the network parameter if the transmission source identifier of the received IP packet coincides with a transmission source identifier recorded in the transmission source identifier table. A packet extraction/transmission unit (8) extracts the IP packet stored in the first buffer (7) from the first buffer (7) and transmits the packet.

14 Claims, 8 Drawing Sheets

(51) Int. Cl.
  *H04L 12/64*    (2006.01)
  *H04L 12/741*   (2013.01)
  *H04L 29/06*    (2006.01)

(56) References Cited

U.S. PATENT DOCUMENTS

| | | | | |
|---|---|---|---|---|
| 2005/0008039 A1* | 1/2005 | Funaya | ............... | H04H 40/18 370/474 |
| 2005/0078678 A1* | 4/2005 | Kim | ............... | H04L 12/1868 370/390 |
| 2006/0064266 A1* | 3/2006 | Mok | ............... | H04W 24/06 702/117 |
| 2008/0267081 A1* | 10/2008 | Roeck | ............... | H04L 47/10 370/249 |
| 2012/0236111 A1 | 9/2012 | Halavy et al. | | |

OTHER PUBLICATIONS

"Internet Protocol RFC791", accessed at http://datatracker.ietf.org/doc/rfc791/.
"RTP: A Transport Protocol for Real-Time Application RFC3550", accessed at http:/datatracker.ietf.org/doc/rfc3550/.
"User Datagram Protocol" accessed at http://datatracker.ietf.org/doc/rfc768/.
Japanese Office Action of related Japanese Patent Application No. 2014-061729 dated Feb. 3, 2015.

\* cited by examiner

AUTOMATIC PACKET RECEPTION APPARATUS

CROSS-REFERENCE TO RELATED APPLICATIONS

This application is a National Stage entry of International Application No. PCT/JP2014/081207, filed Nov. 26, 2014, which claims priority to Japanese Patent Application No. 2014-061729, filed Mar. 25, 2014. The disclosure of the prior applications are hereby incorporated in their entirety by reference.

FIELD

The present invention relates to an automatic packet reception apparatus capable of automatically receiving, without confusion, without resetting network parameters on the receiving side, IP packets transmitted from a plurality of transmission apparatuses.

BACKGROUND

In some cases, IP packets are transmitted from a plurality of transmission apparatuses to one reception apparatus through an internet protocol (IP) network in different time periods. A format of IP packets used for communication is well known (see, for example, Non Patent Literatures 1 to 3).

There is a need to unfailingly set basic connection information in an IP packet every time IP communication is performed. In particular, setting of a transmission source IP address, a destination IP address, a transmission source port number and a transmission destination port number in a header of an IP packet is indispensable. These information items: a transmission source IP address, a destination IP address, a transmission source port number and a transmission destination port number are referred to as network parameters in this specification. A conventional reception apparatus selects IP packets to be stored in a buffer by checking network parameters in received IP packets.

A system in which streams of video to be relayed from three sites A, B, and C are transmitted to a site Z through an IP network will be considered. More specifically, video transmission from the site A to the site Z is performed from 10:00 to 12:00; video transmission from the site B to the site Z is performed from 12:30 to 14:30; and video transmission from the site C to site the Z is performed from 15:00 to 17:00. transmission apparatuses that transmit IP packets for the streams of videos are installed at the sites A, B, and C, and a reception apparatus hat receives IP packets transmitted from these sites is installed at the site Z.

There is, therefore, a need to perform a network parameter setting change operation on the reception apparatus at site Z in each of a time period from 9:30 to 10:00 for the site A, a time period from 12:00 to 12:30 for the site B and a time period from 14:30 to 15:00 for the site C before relays from the sites A to C.

CITATION LIST

Non Patent Literature

[NPL 1] "Internet Protocol RFC791", http://datatracker.ietf.org/doc/rfc791/
[NPL 2] "User Datagram Protocol", http://datatracker.ietf.org/doc/rfc768/
[NPL 3] "RTP: A Transport Protocol for Real-Time Applications RFC3550", https://datatracker.ietf.org/doc/rfc3550/

SUMMARY

Technical Problem

However, there is a need to secure network setting operation staff only for changeover and there is a problem in terms of operation cost. There is also a problem in terms of safe operation in that an error can occur easily if the changeover time is extremely short. On the other hand, with automatic receiving for eliminating the need for such an every time setting change operation, there is thought to be a problem that if accidental video transmission from the site B to the site Z occurs during video relay from the site A to the site Z, the desired video relayed from the site A to the site Z is disturbed.

The present invention has been achieved to solve the above-described problems, and an object of the present invention is to obtain an automatic packet reception apparatus capable of automatically receiving, without confusion, without resetting network parameters on the receiving side, IP packets transmitted from a plurality of transmission apparatuses.

Solution to Problem

An automatic packet reception apparatus according to the present invention includes: a packet receiving unit receiving an IP packet having a network parameter and a transmission source identifier; a transmission source identifier table recording the transmission source identifier of the received IP packet; a first buffer; a packet storage processing unit storing the received IP packet in the first buffer regardless of the network parameter if the transmission source identifier of the received IP packet coincides with a transmission source identifier recorded in the transmission source identifier table; a packet extraction/transmission unit extracting the IP packet stored in the first buffer from the first buffer and transmitting the extracted packet, wherein when no IP packet having a particular transmission source identifier exists in the first buffer, the packet extraction/transmission unit updates the transmission source identifier table.

Advantageous Effects of Invention

The present invention makes it possible to automatically receive, without confusion, without resetting network parameters on the receiving side, IP packets transmitted from a plurality of transmission apparatuses.

DESCRIPTION OF EMBODIMENTS

An automatic packet reception apparatus according to the embodiments of the present invention will be described with reference to the drawings. The same components will be denoted by the same symbols, and the repeated description thereof may be omitted.

Embodiment 1

Figure 1:
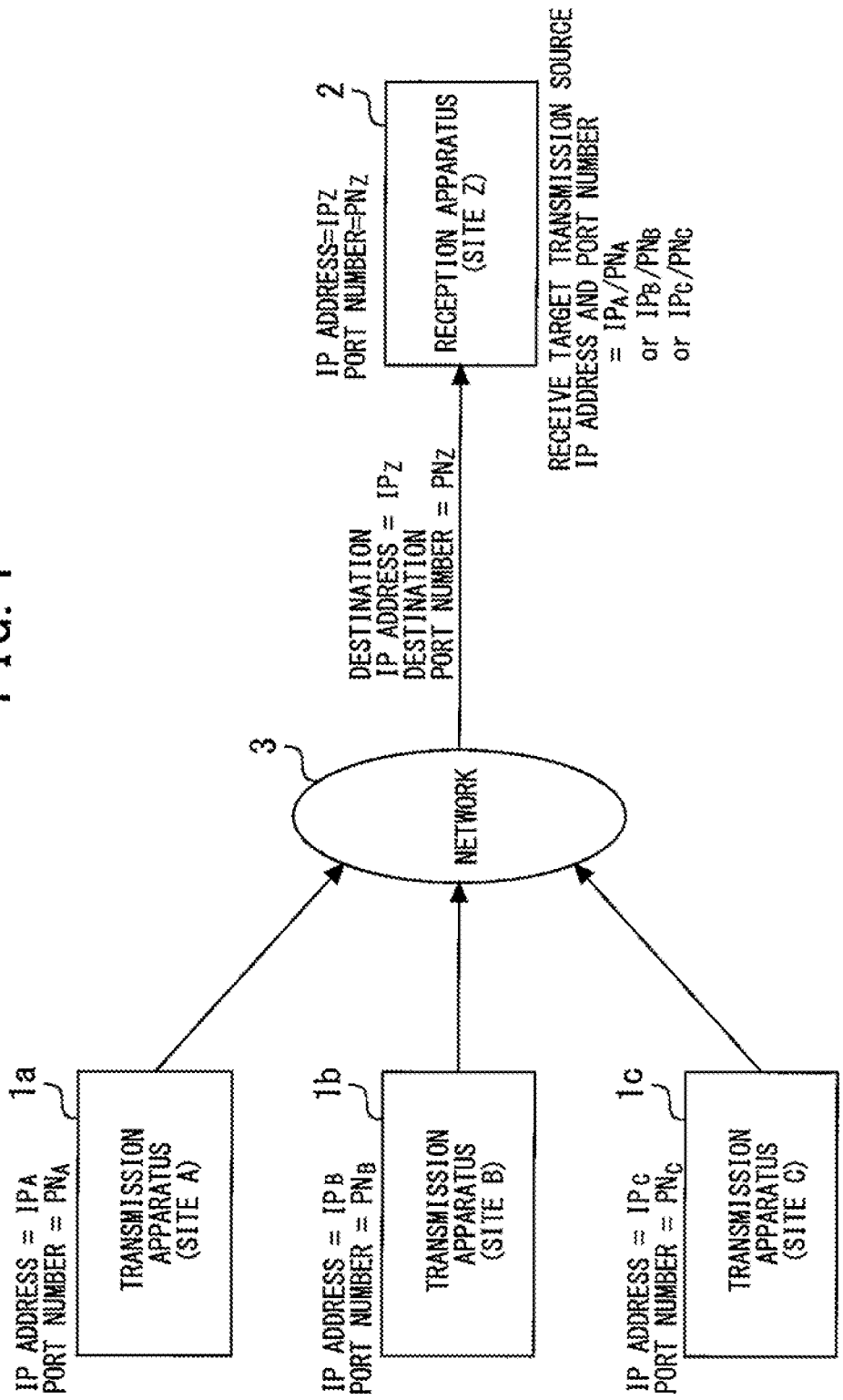
FIG. 1 is a diagram showing a video transmission system according to Embodiment 1 of the present invention.

FIG. 1 is a diagram showing a video transmission system according to Embodiment 1 of the present invention. Transmission apparatuses 1a, 1b, and 1c each of which transmits video by changing the video into IP packets are installed at sites A, B, and C, respectively. An automatic packet reception apparatus 2 that receives IP packets from these sites is installed at a site Z. The transmission apparatus 1a at the site A performs video transmission to the automatic packet reception apparatus 2 at the site Z via an IP network 3 from 10:00 to 12:00; the transmission apparatus 1b at the site B performs similar video transmission from 12:30 to 14:30; and the transmission apparatus 1a at the site C performs similar video transmission from 15:00 to 17:00. IP addresses for the transmission apparatuses 1a, 1b, and 1c and the automatic packet reception apparatus 2 are $IP_A$, $IP_B$, $IP_C$, and $IP_Z$, respectively, and corresponding port numbers are $PN_A$, $PN_B$, $PN_C$, and $PN_Z$.

The video transmission site is changed from the site A to the site B or from the site B to the site C in some time period. Even when such a change is made, the automatic packet reception apparatus 2 can automatically receive, without confusion, without resetting network parameters on the receiving side, IP packets transmitted from all the transmission apparatuses 1a, 1b, and 1c.

Figure 2:
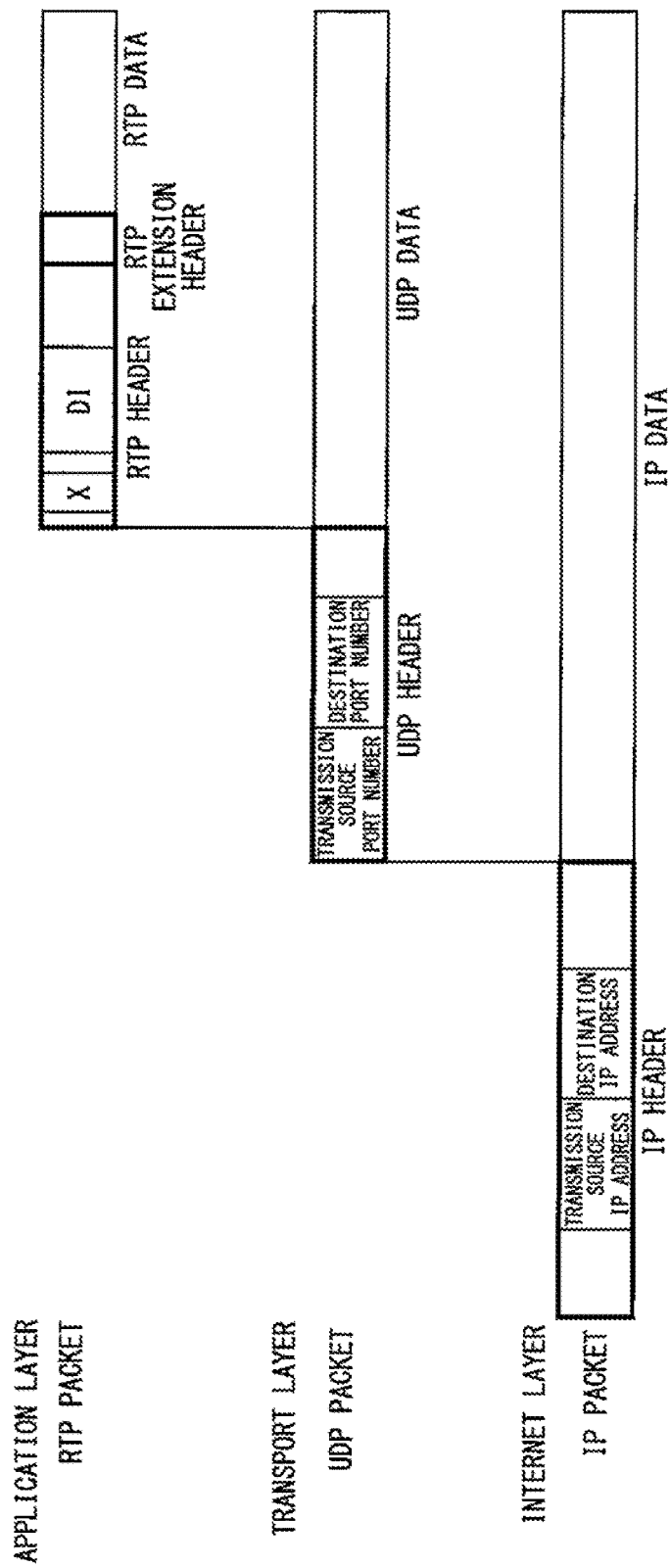
FIG. 2 is a diagram showing a configuration of an IP packet.

FIG. 2 is a diagram showing a configuration of an packet. An IP header is provided in an Internet layer; a UDP header, in a transport layer; and an RTP header in an application layer. In the application layer, when 1 is set as X bit in the RTP header, an RTP extension header can be used by being inserted after the RTP header. This extension header includes a region freely defined by a user.

Figure 3:
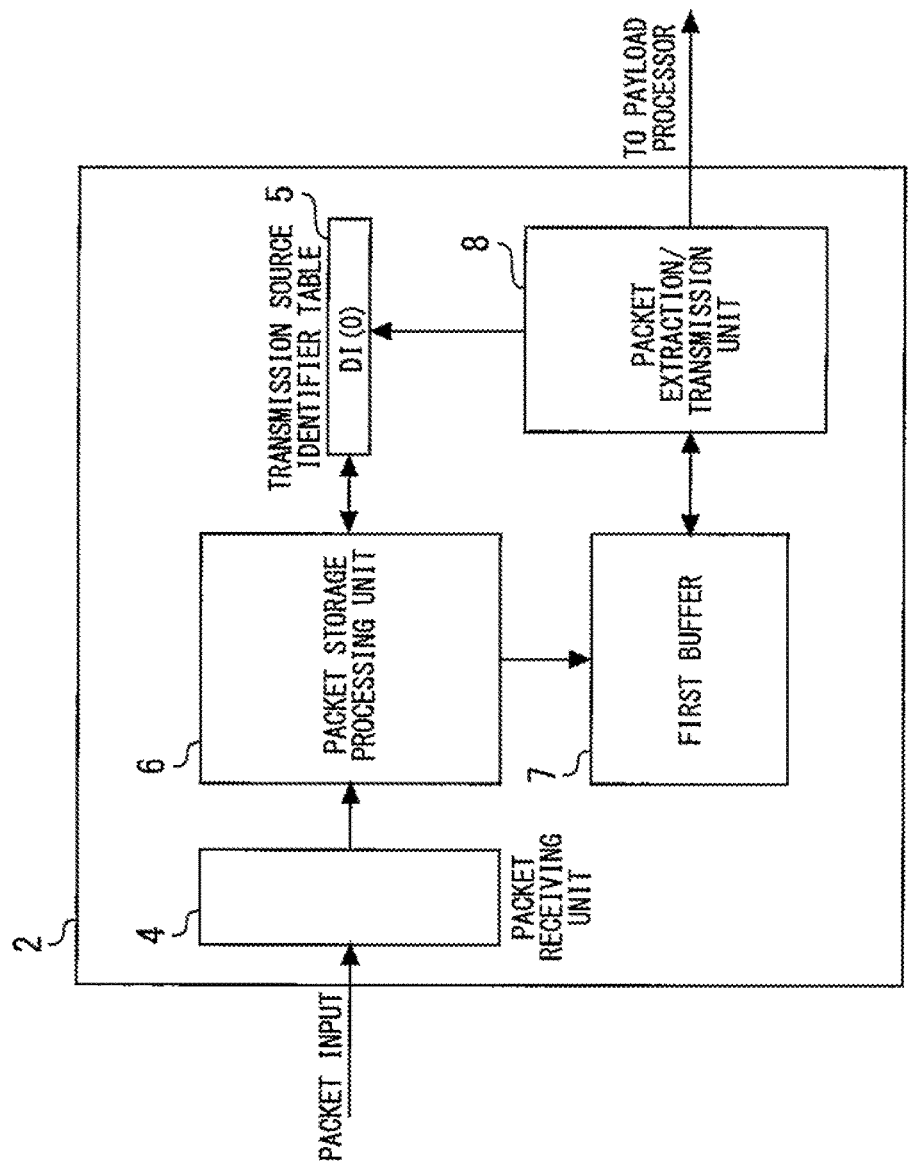
FIG. 3 is a diagram showing the automatic packet reception apparatus according to Embodiment 1 of the present invention.

FIG. 3 is a diagram showing the automatic packet reception apparatus according to Embodiment 1 of the present invention. A packet receiving unit 4 receives an IP packet having network parameters and a transmission source identifier. A transmission source identifier table 5 records the transmission source identifier of the received IP packet. The transmission source identifier table 5 is a table of array D capable of storing N number at the maximum of information items on N number of transmission source identifiers DI(0) to DI(N−1) in order from address 0. In Embodiment 1, it is assumed that N=1 and transmission source identifier information to be stored in the transmission source identifier table is only DI(0).

A packet storage processing unit 6 stores the received IP packet in a first buffer 7 regardless of the network parameters if the transmission source identifier of the received IP packet coincides with the transmission source identifier DI(0) recorded at a top address in the transmission source identifier table 5. A packet extraction/transmission unit 8 extracts the IP packet stored in the first buffer 7 from the first buffer 7 and transmits the extracted packet in packet form.

The transmission source identifier is given in the IP packet on the transmitting side and is called a device identifier (DI) in this specification. For example, the transmission source identifier is an SSRC (synchronization source) contained in the RTP packet in the IP packet. A random number is ordinarily set as SSRC. It can be said that a duplication of a value can be completely avoided among all the transmission apparatuses by devising a random number computation starting point. A user-defined transmission source identification symbol recorded in the RTP extension header may alternatively be used as the transmission source identifier. In such a case, there is a need to determine. In advance to set a different value among the transmission apparatuses. These transmission source identifiers are recorded in the IP packet separately from the network parameters.

Figure 4:
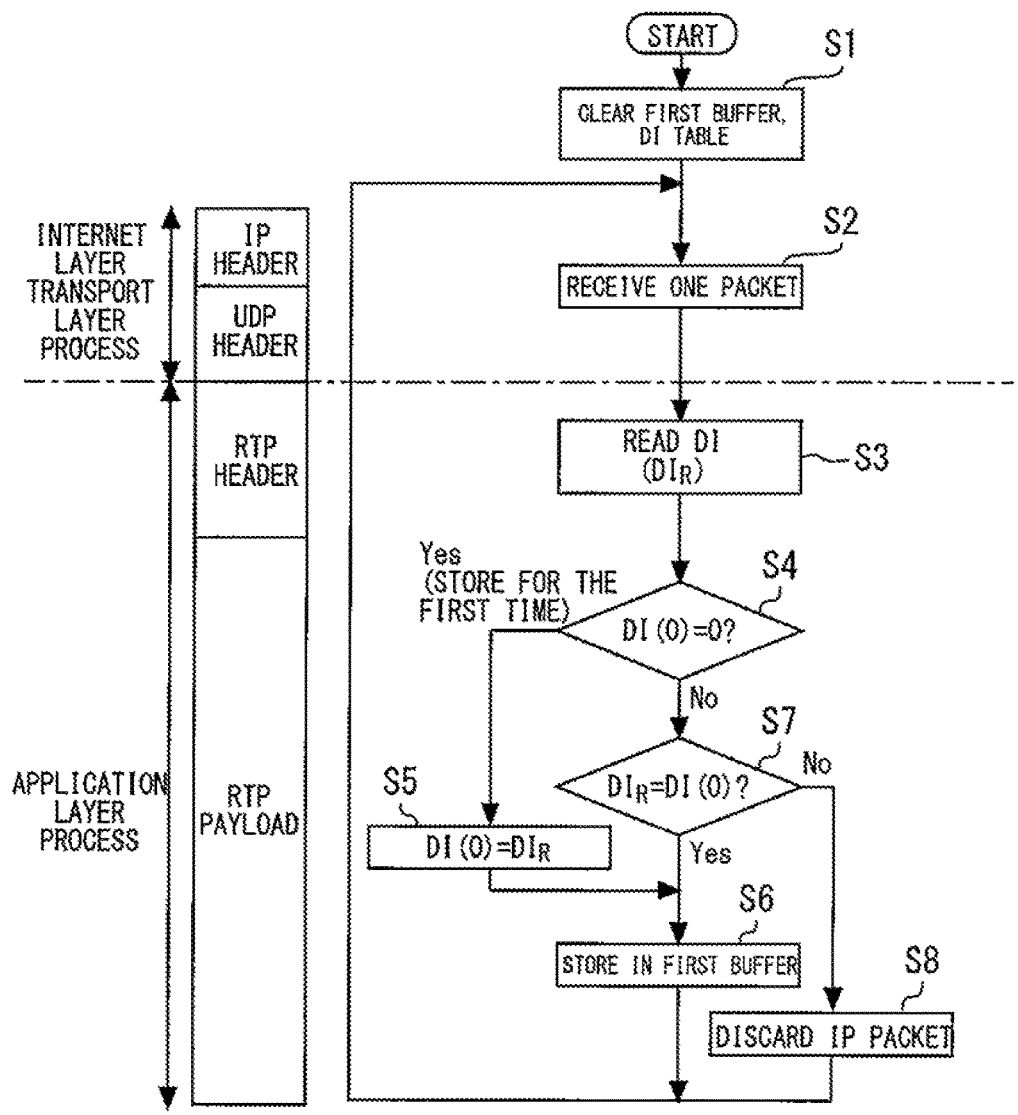
FIG. 4 is a diagram showing the flow of processing in the buffer storage processing unit according to Embodiment 1 of the present invention.

FIG. 4 is a diagram showing the flow of processing in the buffer storage processing unit according to Embodiment 1 of the present invention. First, it is assumed that IP packets are transmitted from the transmission apparatus 1a at the site A toward the automatic packet reception apparatus 2. When the automatic packet reception apparatus 2 is started, the packet storage processing unit 6 clears, for initialization, the first buffer 7 and the transmission source identifier table 5 to zero (step S1).

Subsequently, one IP packet is received through the packet receiving unit 4 (step S2). If no IP packet arrives, the reception apparatus is in a standby state. When one IP packet is received, the transmission source identifier is mad from the IP packet. The read value is assumed to be $DI_R$ (step S3). The transmission source identifier table 5 posteriorly writes and stores, in order of arrival, a combination of all types of transmission source identifiers having arrived at the automatic packet reception apparatus 2. If the same transmission source identifier as one received one has already been stored, the received one is not posteriorly written. That is, in Embodiment 1, only the transmission source identifier having arrived first is recorded. Because of initial clearing in step S1, the transmission source identifier DI(0) at the top of the transmission source identifier table 5 is 0 at the time of arrival of the first IP packet (step S4). Then the transmission source identifier read in step S3 is recorded as DI(0) (step S5). This IP packet is stored in the first buffer 7 (step S6).

If the transmission source identifier of the second received IP packet is identical to that of the first received IP packet (step S7), the second received IP packet is stored in the first buffer 7 (step S6). Thus, IP packets having the same transmission source identifier are successively stored in the first buffer 7.

In the case where change from reception from the site A (10:00 to 12:00) to reception from the site B (12:30 to 14:30), waiting for receiving IP packets begins at the point in time 12:00 at which reception from the site A ends (step S2). In this case, the transmission source identifier DI(0) presently used is cleared to zero. This processing is performed by the packet extraction/transmission unit 8, as described below.

In the event that the transmitting device 1b at the site B accidentally transmits IP packets while the automatic packet reception apparatus 2 at the site Z is receiving IP packets from the transmission apparatus 1a at the site A, the IP packets from the transmission apparatus 1b are discarded (step S8) since the transmission source identifier is different from the transmission source identifier under processing (step S7).

Figure 5:
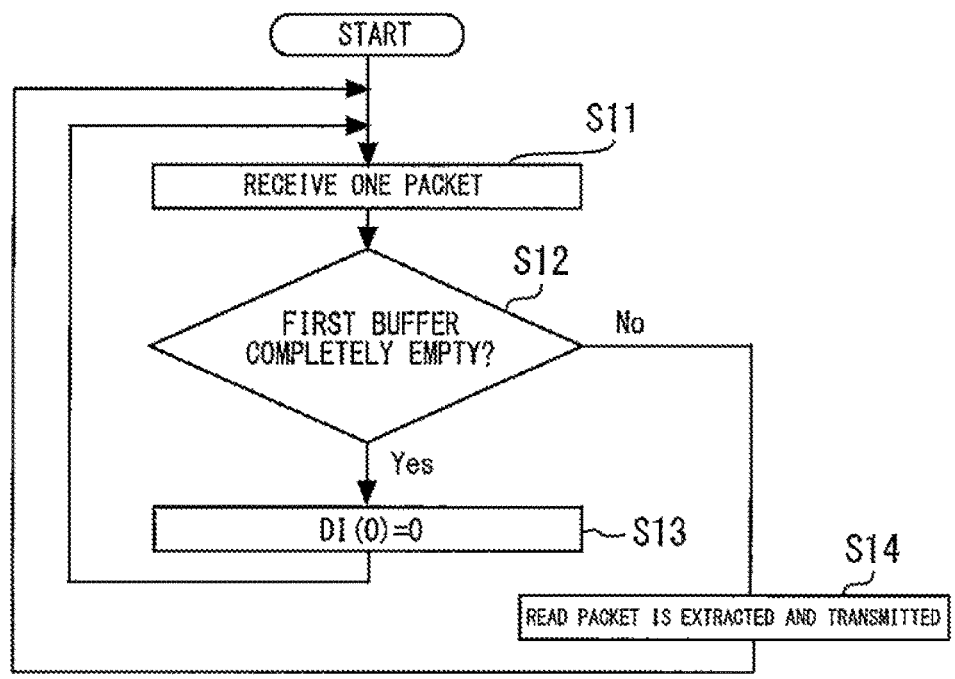
FIG. 5 is a diagram showing the flow of processing in the packet extraction/transmission unit according to Embodiment 1 of the present invention.

FIG. 5 is a diagram showing the flow of processing in the packet extraction/transmission unit according to Embodiment 1 of the present invention. IP packets are read from the first buffer 7 (step S11). However, if no IP packets are contained in the first buffer 7 (step S12), the transmission source identifier table 5 is updated so that DI(0)=0 (step S13) and read is repeated (steps S11, S12, S13). If at least one IP packet is contained in the first buffer 7, the read IP packet is extracted from the first buffer 7 and is transmitted in packet form (step S14).

In the present embodiment, as described above, a received IP packet is stored in the first buffer 7 regardless of network parameters if the transmission source identifier of the received IP packet coincides with a transmission source identifier recorded in the transmission source identifier table 5, thereby enabling all incoming IP packets to be received by ignoring the network parameters of the received IP packets.

Also, only IP packets having the same transmission source identifier as that of IP packets already received are processed. Therefore, IP packets transmitted from a plurality of transmission apparatuses can be automatically received without confusion and without resetting network parameters on the receiving side in conformity with the format of the IP packets. Accordingly, even when IP packets not expected on the site Z side arrive, no influence occurs on video relayed from the site A to the site Z.

Also, when the transmission source is changed from the site A to the site B in relaying, no IP packets having the transmission source identifier recognized before the change arrive after the change but IP packets having another transmission source identifier arrive. In this case, receiving only IP packets having the new transmission source identifier is continued. Thus, even after the transmission source is changed, reception from the new transmission source can be continued without resetting network parameters on the receiving side.

Embodiment 2

Figure 6:
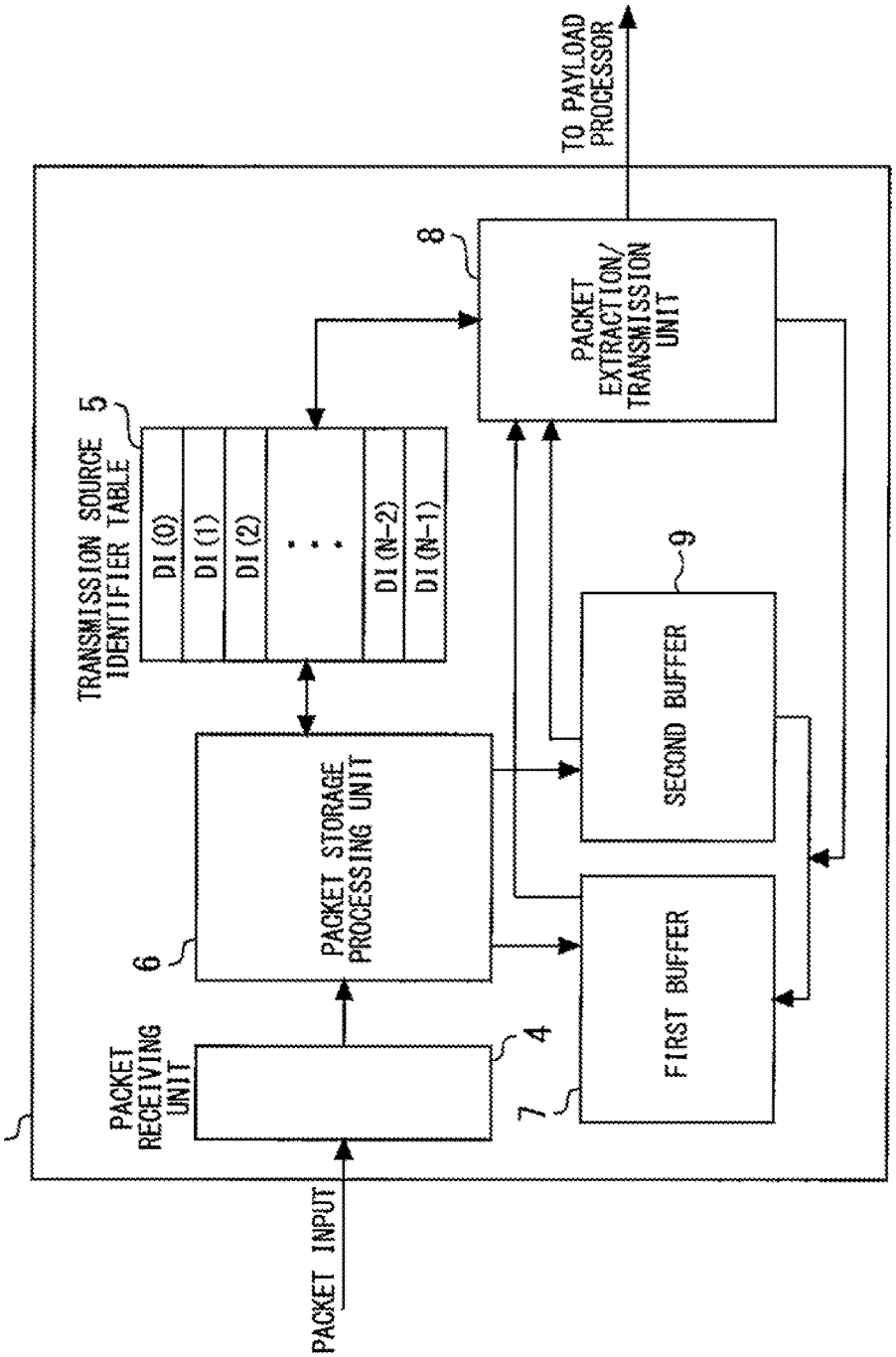
FIG. 6 is a diagram showing an automatic packet reception apparatus according to Embodiment 2 of the present invention.

FIG. 6 is a diagram showing an automatic packet reception apparatus according to Embodiment 2 of the present invention. Not only the first buffer 7 but also a second buffer 9 is provided. The packet storage processing unit 6 stores IP packets having a certain one type of transmission source identifier in the first buffer 7 and stores IP packets having other transmission source identifiers in the second buffer 9. The packet extraction/transmission unit 8 transmits IP packets having a particular transmission source identifier from the second buffer 9 to the first butler 7.

Figure 7:
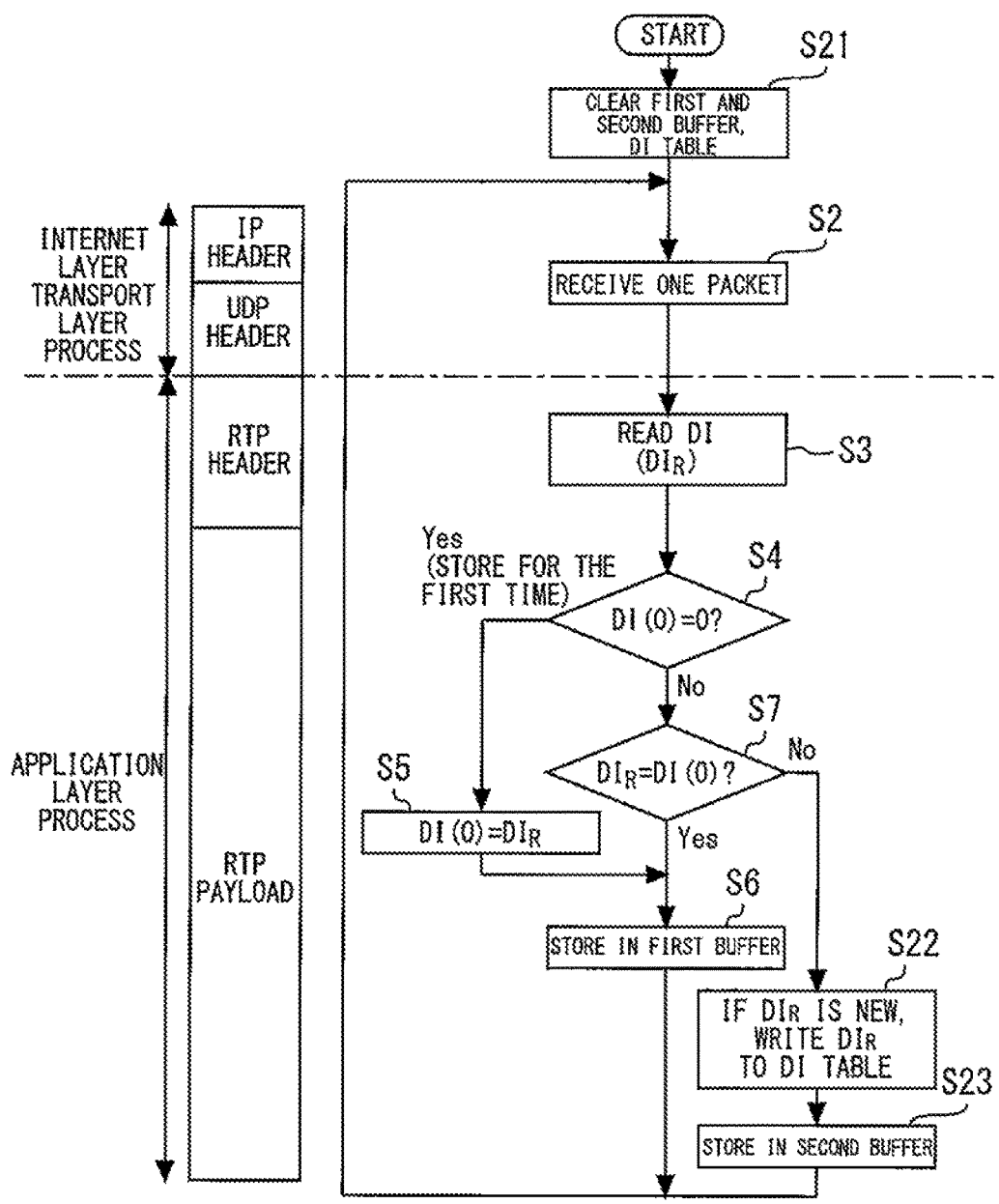
FIG. 7 is a diagram showing the flow of processing in the buffer storage processing unit according to Embodiment 2 of the present invention.

FIG. 7 is a diagram showing the flow of processing in the buffer storage processing unit according to Embodiment 2 of the present invention. The difference from the flow of processing in Embodiment 1 will be described. The packet storage processing unit 6 clears, for initialization, not only the first buffer 7 and the transmission source identifier table 5 but also the second buffer 9 to zero (step S21).

When reception from the site B is started subsequently to reception from the site A, the read transmission source identifier differs from the transmission source identifier DI(0) under processing (step S7). Therefore, the read transmission source identifier table is posteriorly written to the transmission source identifier table 5 (step S24). In this writing, one row is added at the end of the effective data in the transmission source identifier table 5. If the subsequent area is an unused area, 0 is contained therein. All the received transmission source identifiers are thus recorded in the transmission source identifier table 5.

In Embodiment 1, a case is assumed where there is a cessation of packet reception through thirty minutes between transmission from the site A and transmission from the site B. That is, in a state of waiting for receiving packets after the completion of reception from the site A (step S2), reception from the site B is started. In this case, since DI(0) has been used, DI(1) is posteriorly written to the transmission source identifier table 5. Receiving IF packets from the site B requires setting the value of DI(1) to DI(0). This update of the transmission source identifier table 5 is performed by the packet extraction/transmission unit 8, as described below.

For example, in a case where transmission from the site A is 10:00 to 12:30 and transmission from the site B is 12:29 to 14:30, a certain overlap occurs at the time of changeover. In Embodiment 2, therefore, the second buffer 9 is added and IP packets from the site B are accumulated and stored in the second buffer 9 (step S23) instead of discarding the IP packets as in Embodiment 1.

Figure 8:
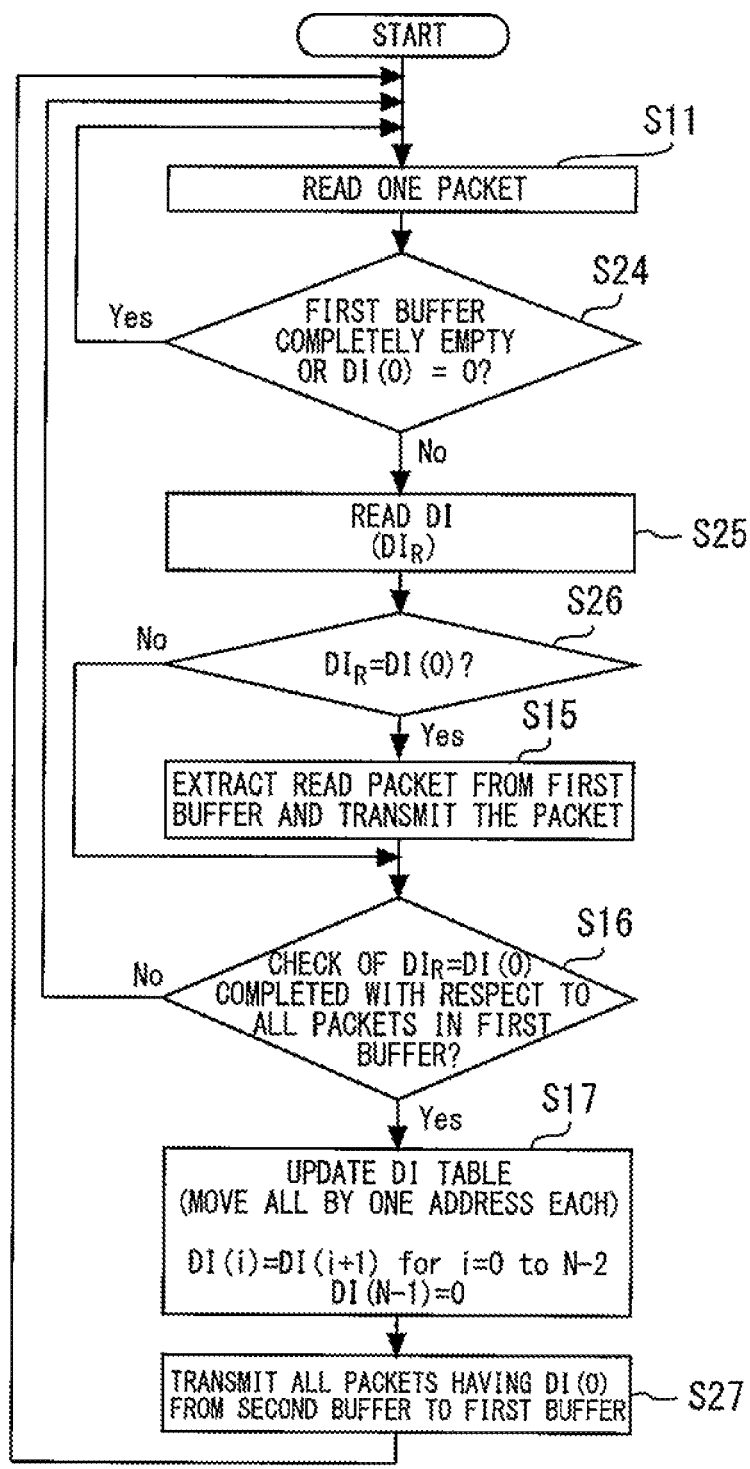
FIG. 8 is a diagram showing the flow of processing in the packet extraction/transmission unit according to Embodiment 2 of the present invention.

FIG. 8 is a diagram showing the flow of processing in the packet extraction/transmission unit according to Embodiment 2 of the present invention. IP packets from the site A accumulated in the first buffer 7 are read (steps S11, S24), as in Embodiment 1. If at least one IP packet is contained in the first buffer 7, the contents of the one IP packet are read (step S25). If the transmission source identifier $DI_R$ of the IP packet coincides with the transmission source identifier DI(0) recorded at the top address in the transmission source identifier table 5 (step S26), the read IP packet is extracted from the first buffer 7 and is transmitted in packet form (step S15). The extracted IP packet ceases to exist in the first buffer 7.

Collation with DI(0) is repeated for all the IP packets in the first buffer 7 (steps S11, S24, S25, S26, S15, S16). When all the collations are finished; no IP packet having the transmission source identifier DI(0) exists in the first buffer; and extraction of the packets is completed, the transmission source identifier table 5 is updated (step S17). For example, one address shifts of the contents of the array DI, such as a shift of DI(1) into DI(0) and a shift of DI(2) into DI(1), are made. The space after the effective data is filled with 0 to enable understanding that no effective data exists thereafter.

Thereafter, the IP packets from the site B accumulated in the second buffer 9 are moved into the first buffer 7 (step S27). Since DI(0) is changed to the value of IP packets from the site B by updating the transmission source identifier table 5, steps S11, S24, S25, S26, S15, and S16 are executed on the first buffer 7 to continue processing on the IP packets from the site B. That is, even in a case where a plurality of sorts of packets exist mixedly at the time of changeover, the packets can be changed with no problem.

In the present embodiment, as described above. IP packets having a certain one type of transmission source identifier are stored in the first buffer 7 and IP packets having other transmission source identifiers are stored in the second buffer 9. Thus, even in a case where packets having different transmission source identifiers exist mixedly at the time of change of transmission sources or the like, IP packets having the present transmission source identifier and IP packets having a new transmission source identifier can be separately stored in the first buffer 7 and in the second buffer 9, respectively. Also, after processing of the IP packets having the present transmission source identifier is finished, processing can be successively performed by moving the IP packets having the new transmission source identifier into the first buffer 7. Change of transmission sources can thus be made smoothly.

While two buffers are prepared in Embodiment 2, three or more buffers may be used and separated with respect to transmission source identifiers. In a case where buffers are separated with respect to transmission source identifiers, a similar effect can be obtained by changing the packet storage buffer and the buffer from which packets are extracted, without moving IP packet into the first buffer 7 when transmission sources are changed. While a case where change of transmission apparatuses from one for the site A to one for the site B and from one for the site B to one for the site C is made has been described above, similar processing can also be performed if transmission source identifiers are changed in a case where network parameters of one transmission apparatus are changed.

REFERENCE SIGNS LIST

2 automatic packet reception apparatus; 4 packet receiving unit; 5 transmission source identifier table; 6 packet storage processing unit; 7 first buffer; 8 packet extraction/transmission unit; 9 second buffer

The invention claimed is:

1. A packet reception apparatus receiving an IP packet having a transmission source identifier comprising:
   a transmission source identifier table recording the transmission source identifier of the received IP packet; and
   a first buffer,
   wherein the packet reception apparatus stores the received IP packet in the first buffer if the transmission source identifier of the received IP packet coincides with a transmission source identifier recorded in the transmission source identifier table,
   the packet reception apparatus extracts the IP packet stored in the first buffer from the first buffer and transmits the extracted packet, and
   when no IP packet which is extracted and transmitted exists in the first buffer, the packet reception apparatus updates the transmission source identifier table.

2. The packet reception apparatus of claim 1, further comprising a second buffer,
   wherein the packet reception apparatus stores an IP packet having a certain one type of transmission source identifier in the first buffer and stores IP packets having other types of transmission source identifiers in the second buffer.

3. The packet reception apparatus of claim 2, wherein the packet reception apparatus transmits an IP packet having a particular transmission source identifier from the second buffer to the first buffer, extracts an IP packet having a transmission source identifier, which coincides with a transmission source identifier recorded in the transmission source identifier table, from the first buffer and transmits the extracted packet in packet form.

4. The packet reception apparatus of claim 1, wherein the transmission source identifier is at least one of an SSRC (synchronization source) contained in an RTP header in the IP packet and a transmission source identification symbol recorded in an RTP extension header.

5. The packet reception apparatus of claim 2, wherein the transmission source identifier is at least one of an SSRC (synchronization source) contained in an RTP header in the IP packet and a transmission source identification symbol recorded in an RTP extension header.

6. The packet reception apparatus of claim 3, wherein the transmission source identifier is at least one of an SSRC (synchronization source) contained in an RTP header in the IP packet and a transmission source identification symbol recorded in an RTP extension header.

7. A packet reception apparatus receiving an IP packet having a transmission source identifier comprising:
   a transmission source identifier table recording the transmission source identifier of the received IP packet; and
   a first buffer,
   wherein when no transmission source identifier is recorded in the transmission source identifier table, the packet reception apparatus records a transmission source identifier contained in the received IP packet as a first transmission source identifier in the transmission source identifier table,
   when a transmission source identifier of the received IP packet coincides with the first transmission source identifier recorded in the transmission source identifier table, the packet reception apparatus stores the received IP packet in the first buffer,
   the packet reception apparatus extracts the IP packet stored in the first buffer from the first buffer and transmits the extracted packet, and
   when no IP packet having the first transmission source identifier and which is extracted and transmitted exists in the first buffer, the packet reception apparatus updates the transmission source identifier table.

8. The packet reception apparatus of claim 7, wherein the packet reception apparatus deletes the first transmission source identifier recorded in the transmission source identifier table for updating the transmission source identifier table.

9. The packet reception apparatus of claim 8, further comprising a second buffer,
   wherein when a transmission source identifier of the received IP packet does not coincide with the first transmission source identifier recorded in the transmission source identifier table, the packet reception apparatus stores the received IP packet in the second buffer.

10. The packet reception apparatus of claim 9, wherein the transmission source identifier table is configured to record a plurality of different transmission source identifiers,
    when only the first transmission source identifier is recorded in the transmission source identifier table, the packet reception apparatus records the transmission source identifier, which is different from the first transmission source identifier recorded in the transmission source identifier table, as a second transmission source identifier in the transmission source identifier table,
    when no IP packet having the first transmission source identifier exists in the first buffer, the packet reception apparatus records the second transmission source identifier as the first transmission source identifier in the transmission source identifier table and transmits IP packet having the first transmission source identifier from the second buffer to the first buffer.

11. The packet reception apparatus of claim 7, wherein the transmission source identifier is at least one of an SSRC (synchronization source) contained in an RTP header in the IP packet and a transmission source identification symbol recorded in an RTP extension header.

12. The packet reception apparatus of claim 8, wherein the transmission source identifier is at least one of an SSRC (synchronization source) contained in an RTP header in the IP packet and a transmission source identification symbol recorded in an RTP extension header.

13. The packet reception apparatus of claim 9, wherein the transmission source identifier is at least one of an SSRC (synchronization source) contained in an RTP header in the IP packet and a transmission source identification symbol recorded in an RTP extension header.

14. The packet reception apparatus of claim 10, wherein the transmission source identifier is at least one of an SSRC (synchronization source) contained in an RIP header in the IP packet and a transmission source identification symbol recorded in an RTP extension header.

\* \* \* \* \*